US012598325B2

(12) United States Patent
Wang

(10) Patent No.: US 12,598,325 B2
(45) Date of Patent: Apr. 7, 2026

(54) SIGNALING OF PRESELECTION INFORMATION IN MEDIA FILES BASED ON A MOVIE-LEVEL TRACK GROUP INFORMATION BOX

(71) Applicant: Lemon Inc., Grand Cayman (KY)

(72) Inventor: Ye-Kui Wang, San Diego, CA (US)

(73) Assignee: Lemon Inc.

( * ) Notice: Subject to any disclaimer, the term of this patent is extended or adjusted under 35 U.S.C. 154(b) by 312 days.

(21) Appl. No.: 18/311,125

(22) Filed: May 2, 2023

(65) Prior Publication Data

US 2023/0362415 A1 Nov. 9, 2023

Related U.S. Application Data

(60) Provisional application No. 63/390,179, filed on Jul. 18, 2022, provisional application No. 63/354,874, filed on Jun. 23, 2022, provisional application No. 63/338,314, filed on May 4, 2022.

(51) Int. Cl.
*H04N 19/70* (2014.01)
*H04N 19/136* (2014.01)
*H04N 19/42* (2014.01)

(52) U.S. Cl.
CPC ........... *H04N 19/70* (2014.11); *H04N 19/136* (2014.11); *H04N 19/42* (2014.11)

(58) Field of Classification Search
CPC .................................................... H04N 19/70
USPC .................................................. 375/240.26
See application file for complete search history.

(56) References Cited

U.S. PATENT DOCUMENTS

2022/0217452 A1* 7/2022 Wang ...................... H04N 21/85
2024/0406473 A1* 12/2024 Wang ............... H04N 21/23614

FOREIGN PATENT DOCUMENTS

| JP | 2016540416 A | 12/2016 |
| JP | 2018182772 A | 11/2018 |
| JP | 2022546910 A | 11/2022 |
| WO | 2020058494 A1 | 3/2020 |
| WO | 2021122850 A1 | 6/2021 |

OTHER PUBLICATIONS

"Information technology—High efficiency coding and media delivery in heterogeneous environments—Part 2: High Efficiency Video Coding," ISO/IEC JTC 1/SC 29/WG 11 N17661, Rec. ITU-T H. 265 | ISO/IEC 23008-2 (in force edition), ISO/IEC DIS 23008-2:201x (4th Ed.) Apr. 20, 2018, 8 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

(Continued)

*Primary Examiner* — Amir Shahnami
(74) *Attorney, Agent, or Firm* — Conley Rose, P.C.

(57) ABSTRACT

A mechanism for processing video data is disclosed. The mechanism includes determining when playing only a track would result in an incomplete experience, a track in movie (track_in_movie) flag is set to zero to prevent players from playing only the track. A conversion between a visual media data and a media data file is performed based on the track_in_movie flag.

20 Claims, 6 Drawing Sheets

4000

(56) References Cited

OTHER PUBLICATIONS

"Information technology—Coded representation of immersive media—Part 3: Versatile video coding," ISO/IEC JTC 1/SC 29 /WG 11 N 18692, Rec. ITU-T H.266 | ISO/IEC 23090-3, 2020, Jul. 12, 2019, 445 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
"Series H: Audiovisual and Multimedia Systems Infrastructure of audiovisual services—Coding of moving video Versatile supplemental enhancement information messages for coded video bitstreams," Rec. ITU-T Rec. H.274 | ISO/IEC 23002-7, Aug. 2020, 86 pages.
Document: JVET-S2007-v1, Boyce, J., et al., "Supplemental enhancement information for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 83 pages.
"Information technology—Coding of audio-visual objects—Part 12: ISO base media file format," ISO/IEC 14496-12, Seventh Edition, Jan. 2022, 264 pages.
"Information technology—Coding of audio-visual objects—Part 15: Carriage of network abstraction layer (NAL) unit structured video in the ISO base media file format—Amendment 2: Carriage of VVC in ISOBMFF" ISO/IEC 14496-15, 2019, 15 pages.
ISO/IEC 23008-12: "Information technology—High efficiency coding and media delivery in heterogeneous environments—Part 12: Image File Format—Amendment 2: Support for VVC, EVC, slideshows and other improvements," ISO/IEC 23008-12:2017/DAM 2:2021(E), 2021, 39 pages.
"Information technology—coding of audio-visual objects—Part 12: ISO base media file format," ISO/IEC JTC 1/SC 29/WG 03 output document N0471, "Text of CDAM ISO/IEC 14496-12:2021 AMD 1 Improved brand documentation and other improvements", Feb. 2022, 324 pages.
Kondrad, L., et al., "[5.1] On Preselection in ISOBMFF and TrackGroupDescriptionBox," ISO/IEC JTC1/SC29/WG3m59337, Apr. 2022, 8 pages.
Wang, Y.K., "[5.1] [ISOBMFF] Indication of a sub track in a preselection," MPEG input document m59365, Apr. 2022, 3 pages.
Wang, Y.K., "[5.1] [ISOBMFF] Signalling of preselection information", MPEG input document m59366, Apr. 2022, 4 pages.
Wang, Y.K., "Signalling of preselection information in media files based on a movie-level track group information box," 2019, 13 pages.
Stockhammer, T., "Technologies under Consideration for Dynamic Adaptive Streaming over HTTP 23009, Parts 1, 3, 4, 5 and 6," ISO/IEC JTC1/SC29/WG11 MPEG2018/N17XXX, Apr. 2018, 87 pages.
Schreiner, S., "Signaling of Preselections in Isobmff" ISO/IEC JTC 1/SC 29/WG 3 m58088, Oct. 2021, 12 pages.
Schreiner, S., et al., "[ISOBMFF] Signaling of Preselections in ISOBMFF" ISO/IEC JTC 1/SC 29/WG 3 m58901, Jan. 2022, 14 pages.
Foreign Communication From a Related Counterpart Application, European Application No. 23171640.8, Extended European Search Report dated Jun. 20, 2023, 15 pages.
Japanese Office Action from Japanese Patent Application No. 2023-076510 dated Jul. 16, 2024, 13 pages.
Indian Office Action from Indian Patent Application No. 202344031796 dated Nov. 25, 2024.

* cited by examiner 4000
4002
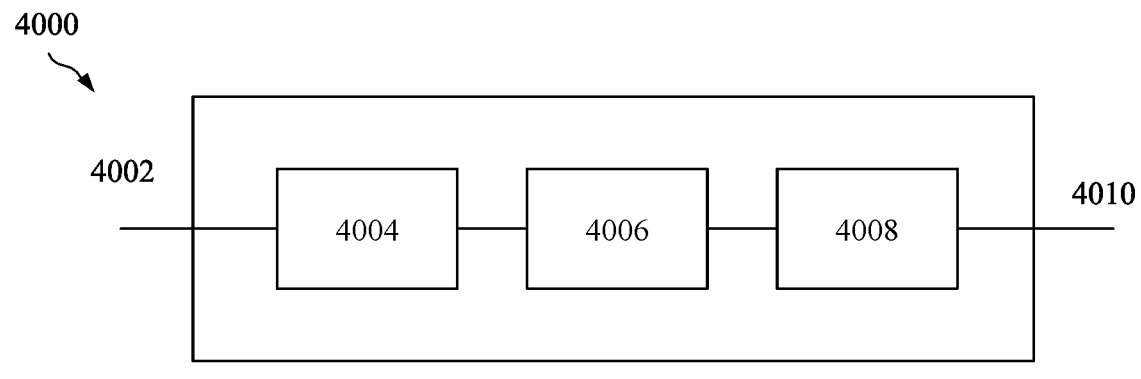
4010
FIG. 1
4100
4102
4104
4106
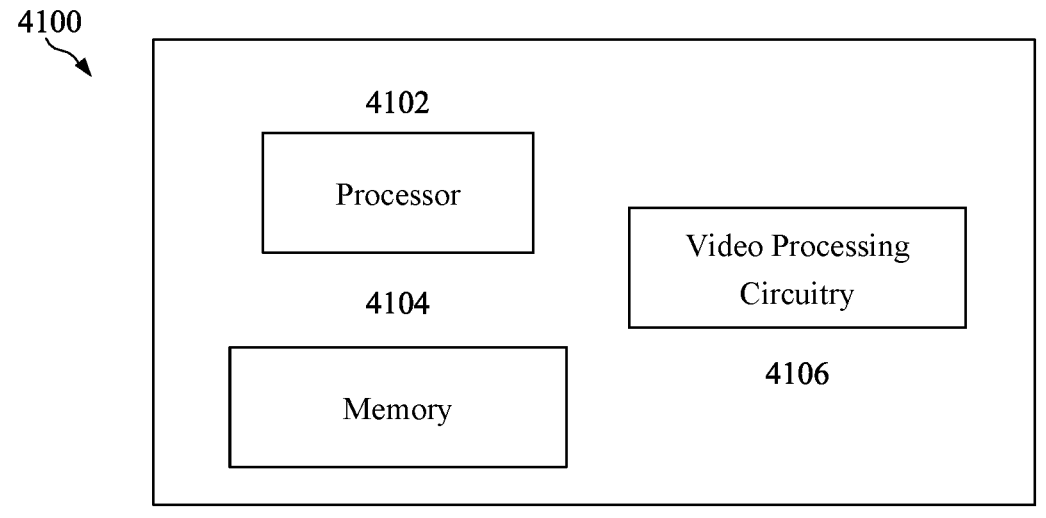
FIG. 2
4200
Determine a value of a track in movie flag for a track in a media data file, wherein the value of the track in movie flag is equal to zero when there is no preselection in the media data file that includes only the track.
4202
Perform a conversion between a visual media data and the media data file based on the track in movie flag.
4204
FIG. 3

4700

4702 — Determine when playing only a track would result in an incomplete experience, a track_in_movie flag is set to zero to prevent players from playing only the track.

4704 — Perform a conversion between a visual media data and the media data file based on the track_in_movie .

SIGNALING OF PRESELECTION INFORMATION IN MEDIA FILES BASED ON A MOVIE-LEVEL TRACK GROUP INFORMATION BOX

CROSS-REFERENCE TO RELATED APPLICATIONS

This application claims the priority to and benefits of U.S. Provisional Application No. 63/338,314, filed on May 4, 2022, U.S. Provisional Application No. 63/354,874, filed on Jun. 23, 2022, and U.S. Provisional Application No. 63/390, 179, filed on Jul. 18, 2022. All of the aforementioned patent applications are hereby incorporated by reference in their entireties.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining when playing only a track would result in an incomplete experience, a track_in_movie (track_in_movie) flag is set to zero to prevent players from playing only the track; and performing a conversion between a visual media data and a media data file based on the track_in_movie flag.

A second aspect relates to an apparatus for processing video data comprising: one or more processors; and a non-transitory memory with instructions thereon, wherein the instructions upon execution by the one or more processors, cause the one or more processors to perform any of the preceding aspects.

A third aspect relates to non-transitory computer readable medium comprising a computer program product for use by a video coding device, the computer program product comprising computer executable instructions stored on the non-transitory computer readable medium such that when executed by one or more processors cause the video coding device to perform the method of any of the preceding aspects.

A fourth aspect relates to a non-transitory computer-readable recording medium storing a bitstream of a video which is generated by a method performed by a video processing apparatus, wherein the method comprises: determining when playing only a track would result in an incomplete experience, a track_in_movie (track_in_movie) flag is set to zero to prevent players from playing only the track; and generating a bitstream based on the determining.

A fifth aspect relates to a method for storing bitstream of a video comprising: determining when playing only a track would result in an incomplete experience, a track_in_movie (track_in_movie) flag is set to zero to prevent players from playing only the track; generating a bitstream based on the determining; and storing the bitstream in a non-transitory computer-readable recording medium.

A sixth aspect relates to a method, apparatus or system described in the present document.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a block diagram showing an example video processing system.

FIG. 2 is a block diagram of an example video processing apparatus.

FIG. 3 is a flowchart for an example method of video processing.

DETAILED DESCRIPTION

Figure 4:
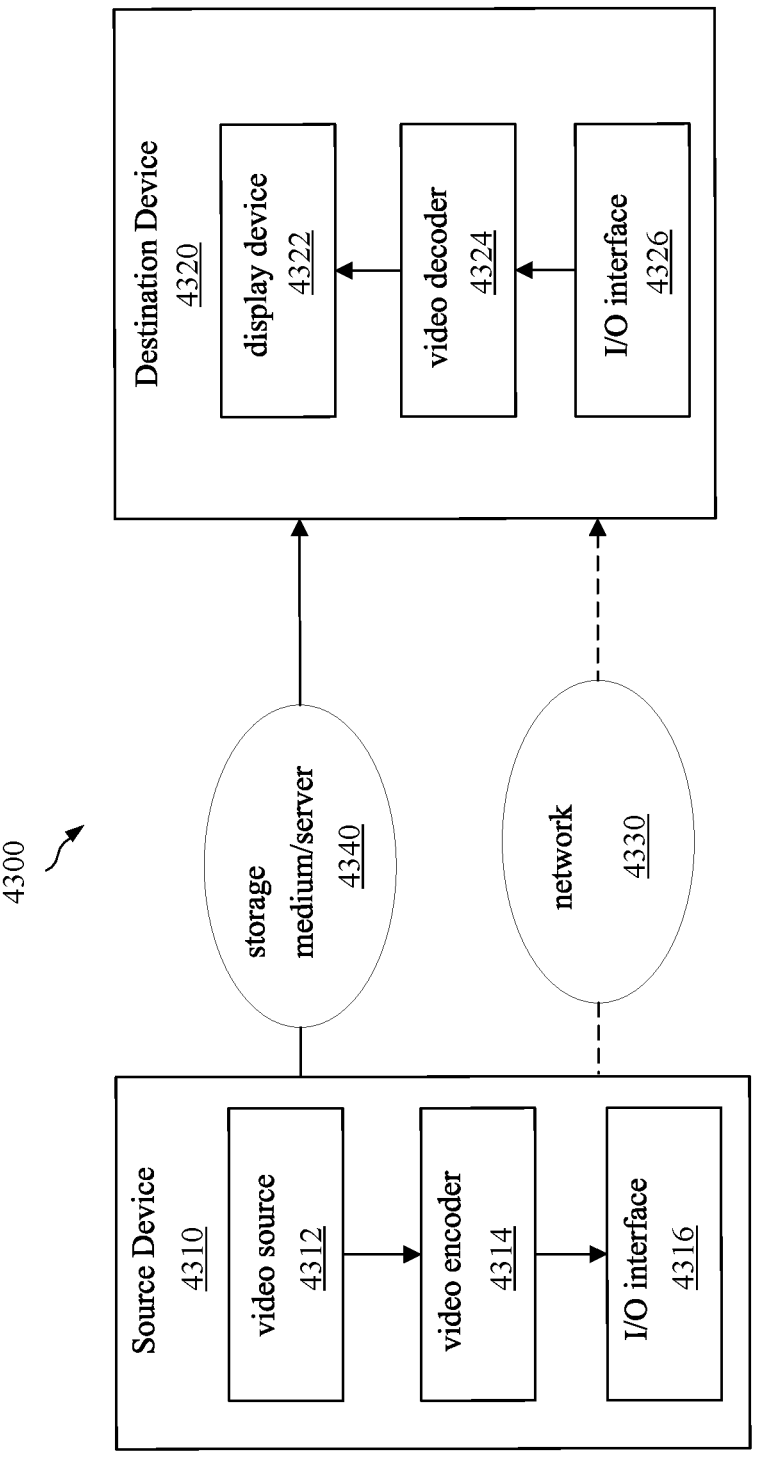
FIG. 4 is a block diagram that illustrates an example video coding system.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by bold italics indicating cancelled text and bold underline indicating added text, with respect to a draft of the Versatile Video Coding (VVC) specification or ISO base media file format (ISOBMFF) file format specification.

1. INITIAL DISCUSSION

This document is related to media file formats. Specifically, it is related to signaling of preselection information in media files based on a movie-level box carrying the information of a track group, wherein a preselection is a set of one or multiple tracks representing one version of the media presentation that may be selected by a user for simultaneous decoding and presentation. The ideas may be applied individually or in various combination, to media files according to any media file formats, e.g., the ISOBMFF and file format derived from the ISOBMFF.

2. VIDEO CODING INTRODUCTION 2.1 Video Coding Standards

Video coding standards have evolved primarily through the development of the International Telecommunication Union Telecommunication Standardization Sector (ITU-T) and International Organization for Standardization and the International Electrotechnical Commission (ISO/IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Many methods have been adopted by JVET and put into the reference software named Joint Exploration Model (JEM) [2]. The JVET was renamed to be the Joint Video Experts Team (JVET) when the Versatile Video Coding (VVC) project officially started. VVC [3] is a coding standard, targeting at 50% bitrate reduction as compared to HEVC.

The Versatile Video Coding (VVC) standard (ITU-T H.266|ISO/IEC 23090-3) [3][4] and the associated Versatile Supplemental Enhancement Information (VSEI) standard (ITU-T H.274|ISO/IEC 23002-7) [5] [6] is designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

2.2 File Format Standards

Media streaming applications are based on the internet protocol (IP), Transmission Control Protocol (TCP), and hypertext transfer protocol (HTTP) transport methods, and rely on a file format such as the ISO base media file format (ISOBMFF) [7]. One such streaming system is dynamic adaptive streaming over HTTP (DASH) [8]. For using a video format with ISOBMFF and DASH, a file format specification specific to the video format, such as the AVC file format and the HEVC file format in [9], would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session. Similarly, for using an image format with ISOBMFF, a file format specification specific to the image format, such as the AVC image file format and the HEVC image file format in [10], would be needed.

2.3 Track Grouping and Entity Grouping

The ISOBMFF specifies both track grouping and entity grouping. Track grouping is signaled based on the track group box that is contained in the track box. In other words, track grouping is a track-level signaling. This track group box enables indication of groups of tracks, where each group shares a particular characteristic or the tracks within a group have a particular relationship. The particular characteristic or the relationship is indicated by the box type of the boxes contained in the track group box. The boxes contained in the track group box include an identifier, which can be used to conclude the tracks belonging to the same track group. The tracks that contain the same type of a contained box within the track group box and have the same identifier value within these contained boxes belong to the same track group.

An entity group is a grouping of items, which may also group tracks. The entities in an entity group share a particular characteristic or have a particular relationship, as indicated by the grouping type. Entity groups are indicated in a GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track. GroupsListBox contains EntityToGroupBoxes, each specifying one entity group.

There are two key differences between tracking grouping and entity grouping:

1) Track grouping signaling is track-level while entity grouping for this purpose would be file level. This difference leads to the following pros and cons for these two mechanisms:
   a. A potential advantage of entity grouping is some bits saving.
   b. An arguable advantage of entity grouping is that less parsing is needed to figure out which tracks contribute to a preselection.
   c. Track grouping has a potential advantage of being more friendly to editing operations such as removing of some tracks without the need of changing the tracking group box (unless some related parameters e.g., the number of tracks is added therein).

2) Entity grouping can also be applied to items, such as image items; track grouping cannot. If there is a use case of having items in a preselection, then this is an advantage for entity grouping.

2.4 Preselection Signaling in the ISOBMFF

An amendment to the ISOBMFF standard is under development. An example specification of this amendment is included in [11], which includes the specification of some features for signaling of preselections. The specification of the features for signaling of preselections in [11] plus changes based on [12], [13], and [14] are as follows.

. . .

3.1 Defections and Terms

. . .

Preselection

A set of one or multiple tracks representing one version of the media presentation that may be selected by a user for simultaneous decoding/presentation.

. . .

8.3.4.x Track Group Description Box 8.3.4.x.1 Definition

Box Type: 'tkgd'

Container: MovieBox or MovieHeaderBox

Mandatory: No

Quantity: Zero or One

5

The TrackGroupDescriptionBox provides an array of TrackGroupEntryBoxes, where each TrackGroupEntryBox provides detailed characteristics of a particular track group. The syntax of the TrackGroupEntryBox is determined by track_group_entry_type. TrackGroupEntryBox is mapped to the track group by a unique track_group_entry_type that is associated with a track_group_type. More than one TrackGroupEntryBox with the same track_group_entry_type may be present in TrackGroupDescriptionBox, in that case TrackGroupEntryBoxes shall have different track_group_id.

8.3.4.x.2 Syntax

```
aligned(8) class TrackGroupDescriptionBox (unsigned int(32) format)
extends Box(format)
{
    // Boxes containing boxes describing track groups
}
aligned(8) class TrackGroupEntryBox (unsigned int(32)
track_group_entry_type, unsigned int(8)
version, unsigned int(24) flags) extends
FullBox(track_group_entry_type, version, flags)
{
    unsigned int(32) track_group_id;
    // the remaining data may be specified
    // for a particular track_group_entry_type
}
```

8.3.4.x.3 Semantics track_group_entry_type indicates a four character code (4CC) that is associated with a track_group_type. The pair of track_group_id and track_group_entry_type identifies the track group that the TrackGroupEntryBox describes.

8.3.4.4.3 Preselection Group Box 8.3.4.4.3.1 Definition

The presence of a TrackGroupTypeBox with track_group_type equal to 'pres', which is also referred to as a PreselectionGroupBox in a track indicates that this track contributes to a preselection. The tracks that have the same value of track_group_id within PreselectionGroupBox are part of the same preselection. Tracks containing a PreselectionGroupBox and not containing all required sub tracks for at least one preselection shall have the track_in_movie flag set to '0' in their TrackHeaderBoxes. This prevents players not understanding the PreselectionBox from playing the track resulting in an incomplete experience. Tracks containing PreselectionGroupBoxes all without describing PreselectionInformationBox shall have the track_in_movie flag set to '0'. NOTE: It is good practice to have one track with track_in_movie flag set to one. This implies that this track provides at least one complete experience.

8.3.4.4.3.2 Syntax

```
aligned(8) class PreselectionGroupBox extends
TrackGroupTypeBox('pres', 0, flags)
{
}
```

8.3.4.4.3.3 Semantics

This Subclause is Empty.

8.3.4.4.4 Preselection Track Group Entry Box 8.3.4.4.4.1 Definition

Box Type: 'prse'
Container: TrackGroupDescriptionBox
Mandatory: No
Quantity: Zero or More Preselections can be qualified, for example, by language, kind or media specific attributes like audio rendering indications, object interactivity or channel layouts. Attributes signalled in a PreselectionTrackGroupEntryBox shall take precedence over attributes signalled in contributing tracks. PreselectionTrackGroupEntryBox shall described only track groups identified by track_group_type equal to 'prse'. All attributes uniquely qualifying a preselection shall be present in PreselectionTrackGroupEntryBox of the preselection.

8.3.4.4.4.2 Syntax

```
aligned(8) class PreselectionTrackGroupEntryBox
(track_group_entry_type = 'prse', version =0,
flags)
    extends TrackGroupEntryBox(track_group_entry_type, version,
    flags)
{
    if (flags & 1) {
        unsigned int(8) selection_priority=1;
    }
    PreselectionInformationBox presel_info;
    PreselectionProcessingBox presel_processing;
}
```

8.3.4.4.4.3 Semantics selection_priority is an integer that declares the priority of the preselection in cases where no other differentiation such as through the media language is possible. A lower number indicates a higher priority. presel_info is an instance of the PreselectionInformationBox, providing information that describes the preselection. presel_processing is an instance of the PreselectionProcessingBox, providing information needed for processing the preselection.

8.3.4.4.5 Preselection Information Box 8.3.4.4.5.1 Definition

Box Type: 'prsi'
Container: PreselectionGroupBox
Mandatory: No
Quantity: Zero or One This Box aggregates all semantic information about the preselection.

8.3.4.4.5.2 Syntax

```
aligned(8) class PreselectionInformationBox
    extends FullBox('prsi', version=0, 0 ){
    unsigned int(8) numTracks;
    // Boxes describing the preselection
}
```

8.3.4.4.5.3 Semantics

This box contains information on what experience is available when this preselection is selected. Boxes suitable to describe a preselection include but are not limited to the following list of boxes defined in this specification:

The audio object box (clause 8.3.4.4.5)
The audio object selection box (clause 8.3.4.4.7)
The extended language tag (clause 8.4.6)
The user data box (clause 8.10.1)
The track kind (clause 8.10.4)
The label box (clause 8.18.4)
The audio rendering indication (clause 8.18.5)
The channel layout (clause 12.2.4.1)

If the user data box is contained in a PreselectionBox, then it shall not carry any of the above boxes. numTracks declares how many tracks are contributing to the playout of the preselection. This value shall match the number of tracks containing a PreselectionGroupBox with the same track_group_id. Note 1: not all tracks contributing to the playout of a preselection may be delivered in the same file. Note2:

The kind box might utilize the Role scheme defined in ISO/IEC 23009-1, clause 5.8.5.5 as it provides a commonly used scheme to describe characteristics of preselections. Further media type specific boxes may be used to describe properties of the preselection.

8.3.4.4.10 Preselection Processing Box 8.3.4.4.10.1 Definition

Box Type: 'prsp'
 Container: PreselectionGroupBox
 Mandatory: Yes
 Quantity: Exactly One
 This box contains information how the tracks contributing to the preselection shall be processed. Media type specific boxes may be used to describe further processing.

8.3.4.4.10.2 Syntax

```
aligned(8) class PreselectionProcessingBox
    extends FullBox('prsp', version=0, flags ){
    utf8string preselection_tag;
    if (flags & 1) {
        unsigned int(8)order=0;
    }
    unsigned int(8) track_order;
    unsigned int(1) sample_merge_flag;
    unsigned int(7) reserved;
    // further attributes and Boxes defining additional processing of
    // the track contributing to the preselection
}
```

8.3.4.4.10.3 Semantics preselection_tag is a codec specific value that a playback system can provide to a decoder to uniquely identify one out of several preselections in the media. order specifies the conformance rules for Representations in Adaptation Sets within the Preselection according to ISO/IEC 23009-1, from the following enumerated set:

0: undefined
 1: time-ordered
 2: fully-ordered track_order defines the order of this track for the merging process described below. sample_merge_flag equal to 1 indicates that this track is enabled to be merged with another track as described below. Tracks contributing to a selected preselection and having the sample_merge_flag equal to 1 shall merge their samples according to the respective media type. If the media type does not specify such a process, contributing samples may be appended to the samples of the track with the next lower track_order. If the generated output samples from this merging process shall be embedded into a new track, this track shall be conformant to a media type derived from the base media type. Note: for MPEG-H 3D Audio, this process is defined in ISO/IEC 23008-3, clause 14.6.

. . .

3. TECHNICAL PROBLEMS SOLVED BY DISCLOSED TECHNICAL SOLUTIONS

Example designs for signaling of preselections in the ISOBMFF using the track grouping mechanism and a movie-level box carrying the information of a track group have the following problems: First it is specified that, tracks containing a PreselectionGroupBox and not containing all required sub tracks for at least one preselection shall have the track_in_movie flag set to '0' in their TrackHeaderBoxes. However, a prelection is defined include a set of one or multiple tracks (e.g., not sub tracks). Therefore, this specification is unclear. Second, it is specified that, tracks containing PreselectionGroupBoxes all without describing PreselectionInformationBox shall have the track_in_movie flag set to '0'. However, in the latest design (as described above in Section 2.4), each track in (or contributing to) a preselection always has a PreselectionGroupBox that always contains a PreselectionInformationBox. Therefore, this specification is unclear. Third, the container box for both the PreselectionInformationBox and the PreselectionProcessingBox is specified to be the PreselectionGroupBox. However, it should be the PreselectionTrackGroupEntryBox instead. Fourth, within a file, the number of tracks belonging to a preselection can be less than the number of tracks signaled for the preselection. In other words, the prelection is incomplete in the file by missing one or more tracks. In this case, those tracks should all be marked by having the track_in_movie flag in the TrackHeaderBoxes equal to '0', to prevent players from playing the tracks that form only a subset of a prelection resulting in an incomplete experience. However, such a constraint is missing.

4. A LISTING OF SOLUTIONS AND EMBODIMENTS

To solve the above-described problem, methods as summarized below are disclosed. The inventions should be considered as examples to explain the general concepts and should not be interpreted in a narrow way. Furthermore, these inventions can be applied individually or combined in any manner.

Example 1

To solve the first problem, it is specified that, for a track that contains a PreselectionGroupBox, when within the file there is no preselection includes only the track, the value of the track_in_movie flag in the TrackHeaderBox of the track shall be equal to '0'.

a. In one alternative, the following is specified:

When playing a track without processing any PreselectionGroupBox contained in the track would result in an incomplete experience, the track_in_movie flag in the TrackHeaderBox should be set to '0' to prevent players not understanding the PreselectionGroupBox from playing the track. One such example is when within the file there is no preselection that consists of only the track.

b. In another alternative, the following is specified:

NOTE: When playing a track without processing any PreselectionGroupBox contained in the track would result in an incomplete experience, setting the track_in_movie flag in the TrackHeaderBox to '0' can be used to prevent players not understanding the PreselectionGroupBox from playing the track. One such example is when within the file there is no preselection that consists of only the track.

Example 2

To solve the second problem, it is specified that, within a file, for a particular preselection that includes a set of tracks containing PreselectionGroupBoxes having a track_group_id equal to a particular value denoted by thisTrackGroupId, when there is no TrackGroupDescriptionBox containing a PreselectionTrackGroupEntryBox with track_group_id equal to thisTrackGroupId, the value of the track_in_movie flag in the TrackHeaderBoxes of all these tracks shall be equal to '0'.

a. In one alternative, the following is specified:

Within a file, for a particular preselection that consists of a set of tracks containing PreselectionGroupBoxes having track_group_id equal to a particular value denoted by this-TrackGroupId, when there is no TrackGroupDescriptionBox containing a PreselectionTrackGroupEntryBox with track_group_id equal to thisTrackGroupId, the value of the track_in_movie flag in the TrackHeaderBoxes of all these tracks should be set to '0'.

b. In another alternative, the following is specified:

NOTE: Within a file, for a particular preselection that consists of a set of tracks containing PreselectionGroup-Boxes having track_group_id equal to a particular value denoted by thisTrackGroupId, when there is no TrackGroup-DescriptionBox containing a PreselectionTrackGroupEntry-Box with track_group_id equal to thisTrackGroupId, setting the value of the track_in_movie flag in the TrackHeader-Boxes of all these tracks to '0' can be used to prevent players from playing the set of tracks.

Example 3

To solve the third problem, the container box for both the PreselectionInformationBox and the PreselectionProcess-ingBox is specified to be the PreselectionTrackGroupEntry-Box.

Example 4

To solve the fourth problem, within a file, when the number of tracks containing PreselectionGroupBoxes having track_group_id equal to a particular value denoted by thisTrackGroupId is less than numTracks in the Preselec-tionInformationBox in the PreselectionTrackGroupEntry-Box with track_group_id equal to thisTrackGroupId, the value of the track_in_movie flag in the TrackHeaderBoxes of all these tracks shall be equal to '0'.

a. In one alternative, the following is specified:

Within a file, when the number of tracks containing PreselectionGroupBoxes having track_group_id equal to a particular value denoted by thisTrackGroupId is less than numTracks in the PreselectionInformationBox in the Prese-lectionTrackGroupEntryBox with track_group_id equal to thisTrackGroupId, the value of the track_in_movie flag in the TrackHeaderBoxes of all these tracks should be set to '0'.

b. In another alternative, the following is specified:

NOTE: Within a file, when the number of tracks contain-ing PreselectionGroupBoxes having track_group_id equal to a particular value denoted by thisTrackGroupId is less than numTracks in the PreselectionInformationBox in the Prese-lectionTrackGroupEntryBox with track_group_id equal to thisTrackGroupId, setting the value of the track_in_movie flag in the TrackHeaderBoxes of all these tracks to '0' can be used to prevent players from playing the set of tracks.

Example 5

5) Alternatively, to solve the second problem and the fourth problem, the following is specified:

Within a file, for a particular preselection that consists of a set of N tracks containing PreselectionGroupBoxes having track_group_id equal to a particular value denoted by this-TrackGroupId, when either or both of the following condi-tions are true, the value of the track_in_movie flag in the TrackHeaderBoxes of all these tracks shall be set to '0':

There is no TrackGroupDescriptionBox containing a Pre-selectionTrackGroupEntryBox with track_group_id equal to thisTrackGroupId.

N is less than numTracks in the PreselectionInformation-Box in the PreselectionTrackGroupEntryBox with track_group_id equal to thisTrackGroupId.

Example 6

6) Alternatively, to solve the second problem and the fourth problem, the following is specified:

Within a file, for a particular preselection that consists of a set of N tracks containing PreselectionGroupBoxes having track_group_id equal to a particular value denoted by this-TrackGroupId, when either or both of the following condi-tions is true, the value of the track_in_movie flag in the TrackHeaderBoxes of all these tracks should be set to '0':

There is no TrackGroupDescriptionBox containing a Pre-selectionTrackGroupEntryBox with track_group_id equal to thisTrackGroupId.

N is less than numTracks in the PreselectionInformation-Box in the PreselectionTrackGroupEntryBox with track_group_id equal to thisTrackGroupId.

Example 7

7) Alternatively, to solve the second problem and the fourth problem, the following is specified:

NOTE: Within a file, for a particular preselection that consists of a set of N tracks containing PreselectionGroup-Boxes having track_group_id equal to a particular value denoted by thisTrackGroupId, when either or both of the following conditions are true, setting the value of the track_in_movie flag in the TrackHeaderBoxes of all these tracks to '0' can be used to prevent players from playing the set of tracks:

There is no TrackGroupDescriptionBox containing a Pre-selectionTrackGroupEntryBox with track_group_id equal to thisTrackGroupId.

N is less than numTracks in the PreselectionInformation-Box in the PreselectionTrackGroupEntryBox with track_group_id equal to thisTrackGroupId.

Example 8

8) Alternatively, to solve the second problem and the fourth problem, the following is specified:

When playing the set of tracks in a preselection in a file would result in an incomplete experience, the track_in_movie flag in the TrackHeaderBoxes of all these tracks should be set to '0' to prevent players from playing the set of tracks. Some such examples are as follows: the preselec-tion consists of a set of N tracks containing Preselection-GroupBoxes having track_group_id equal to a particular value denoted by thisTrackGroupId, and either or both of the following conditions are true:

There is no TrackGroupDescriptionBox containing a Pre-selectionTrackGroupEntryBox with track_group_id equal to thisTrackGroupId.

N is less than numTracks in the PreselectionInformation-Box in the PreselectionTrackGroupEntryBox with track_group_id equal to thisTrackGroupId.

Example 9

9) Alternatively, to solve the second problem and the fourth problem, the following is specified:

NOTE: When playing the set of tracks in a preselection in a file would result in an incomplete experience, setting the value of the track_in_movie flag in the TrackHeaderBoxes of all these tracks to '0' can be used to prevent players from playing the set of tracks. Some such examples are as follows: the preselection consists of a set of N tracks containing PreselectionGroupBoxes having track_group_id equal to a particular value denoted by thisTrackGroupId, and either or both of the following conditions are true:

There is no TrackGroupDescriptionBox containing a PreselectionTrackGroupEntryBox with track_group_id equal to thisTrackGroupId.

N is less than numTracks in the PreselectionInformationBox in the PreselectionTrackGroupEntryBox with track_group_id equal to thisTrackGroupId.

5. EMBODIMENTS

Below are some example embodiments for all the disclosure items and most of their subitems summarized above in Section 4. Most relevant parts that have been added or modified are shown in underlined bold font, and some of the deleted parts are shown in italicized bold fonts. There may be some other changes that are editorial in nature and thus not noted. Parts that remain unchanged are not included.

5.1 First Embodiment

This embodiment is for all the items 1-4.

. . .

8.3.4.4.3 Preselection Group Box
8.3.4.4.3.1 Definition

The presence of a TrackGroupTypeBox with track_group_type equal to 'pres', which is also referred to as a PreselectionGroupBox in a track indicates that this track contributes to a preselection. The tracks that have the same value of track_group_id within PreselectionGroupBox are part of the same preselection.

For a track that contains a PreselectionGroupBox, when within the file there is no preselection that consists of only the track, the value of the track_in_movie flag in the TrackHeaderBox of the track shall be equal to '0'. Within a file, when the number of tracks containing PreselectionGroupBoxes having track_group_id equal to a particular value denoted by thisTrackGroupId is less than numTracks in the PreselectionInformationBox in the PreselectionTrackGroupEntryBox with track_group_id equal to thisTrackGroupId, the value of the track_in_movie flag in the TrackHeaderBoxes of all these tracks shall be equal to '0'. Tracks containing a PreselectionGroupBox and not containing all required sub tracks for at least one preselection shall have the track_in_movie flag set to '0' in their TrackHeaderBoxes. These prevents players not understanding the preselection signalling from playing a set of the tracks that forms only a subset of a prelection resulting in an incomplete experience. This prevents players not understanding the Preselection Box from playing the track resulting in an incomplete experience.

Within a file, for a particular preselection that consists of a set of tracks containing PreselectionGroupBoxes having track_group_id equal to a particular value denoted by thisTrackGroupId, when there is no TrackGroupDescriptionBox containing a PreselectionTrackGroupEntryBox with track_group_id equal to thisTrackGroupId, the value of the track_in_movie flag in the TrackHeaderBoxes of all these tracks shall be equal to '0'. Tracks containing PreselectionGroupBoxes all without describing PreselectionInformationBox shall have the track_in_movie flag set to '0'.

NOTE: It is good practice to have one track with track_in_movie flag set to one. This implies that this track provides at least one complete experience.

. . .

8.3.4.4.5 Preselection Information Box
8.3.4.4.5.1 Definition
Box Type: 'prsi'
Container: PreselectionGroupBox PreselectionTrackGroupEntryBox
Mandatory: No
Quantity: Zero or One
This Box aggregates all semantic information about the preselection.

. . .

8.3.4.4.10 Preselection Processing Box
8.3.4.4.10.1 Definition
Box Type: 'prsp'
Container: PreselectionGroupBox PreselectionTrackGroupEntryBox
Mandatory: Yes
Quantity: Exactly One
This box contains information how the tracks contributing to the preselection shall be processed. Media type specific boxes may be used to describe further processing.

. . .

5.2 Second Embodiment

This embodiment is for all the items 1-4.

. . .

8.3.4.4.3 Preselection Group Box
8.3.4.4.3.1 Definition

The presence of a TrackGroupTypeBox with track_group_type equal to 'pres', which is also referred to as a PreselectionGroupBox in a track indicates that this track contributes to a preselection. The tracks that have the same value of track_group_id within PreselectionGroupBox are part of the same preselection.

For a track that contains a PreselectionGroupBox, when within the file there is no preselection that consists of only the track, the value of the track_in_movie flag in the TrackHeaderBox of the track shall be equal to '0'. Tracks containing a PreselectionGroupBox and not containing all required sub tracks for at least one preselection shall have the track_in_movie flag set to '0' in their TrackHeaderBoxes. This prevents players not understanding the PreselectionBox from playing the track resulting in an incomplete experience.

Within a file, for a particular preselection that consists of a set of N tracks containing PreselectionGroupBoxes having track_group_id equal to a particular value denoted by thisTrackGroupId, when either of the following conditions is true, the value of the track_in_movie flag in the TrackHeaderBoxes of all these tracks shall be equal to '0': There is no TrackGroupDescriptionBox containing a PreselectionTrackGroupEntryBox with track_group_id equal to thisTrackGroupId. N is less than numTracks in the PreselectionInformationBox in the PreselectionTrackGroupEntryBox with track_group_id equal to thisTrackGroupId.

Tracks containing PreselectionGroupBoxes all without describing PreselectionInformationBox shall have the track_in_movie flag set to '0'.

NOTE: It is good practice to have one track with track_in_movie flag set to one. This implies that this track provides at least one complete experience.

. . .

8.3.4.4.5 Preselection Information Box 8.3.4.4.5.1 Definition

Box Type: 'prsi'

Container: PreselectionGroupBox PreselectionTrackGroupEntryBox

Mandatory: No

Quantity: Zero or One

This Box aggregates all semantic information about the preselection.

. . .

8.3.4.4.10 Preselection Processing Box 8.3.4.4.10.1 Definition

Box Type: 'prsp'

Container: PreselectionGroupBox PreselectionTrackGroupEntryBox

Mandatory: Yes

Quantity: Exactly One

This box contains information how the tracks contributing to the preselection shall be processed. Media type specific boxes may be used to describe further processing.

. . .

6. REFERENCES

[1] ITU-T and ISO/IEC, "High efficiency video coding", Rec. ITU-T H.265|ISO/IEC 23008-2 (in force edition).

[2] J. Chen, E. Alshina, G. J. Sullivan, J.-R. Ohm, J. Boyce, "Algorithm description of Joint Exploration Test Model 7 (JEM7)," JVET-G1001, August 2017.

[3] Rec. ITU-T H.266|ISO/IEC 23090-3, "Versatile Video Coding", 2020.

[4] B. Bross, J. Chen, S. Liu, Y.-K. Wang (editors), "Versatile Video Coding (Draft 10)," JVET-S2001.

[5] Rec. ITU-T Rec. H.274|ISO/IEC 23002-7, "Versatile Supplemental Enhancement Information Messages for Coded Video Bitstreams", 2020.

[6] J. Boyce, V. Drugeon, G. J. Sullivan, Y.-K. Wang (editors), "Versatile supplemental enhancement information messages for coded video bitstreams (Draft 5)," JVET-S2007.

[7] ISO/IEC 14496-12: "Information technology—Coding of audio-visual objects—Part 12: ISO base media file format".

[8] ISO/IEC 23009-1: "Information technology—Dynamic adaptive streaming over HTTP (DASH)— Part 1: Media presentation description and segment formats".

[9] ISO/IEC 14496-15: "Information technology—Coding of audio-visual objects—Part 15: Carriage of network abstraction layer (NAL) unit structured video in the ISO base media file format".

[10] ISO/IEC 23008-12: "Information technology—High efficiency coding and media delivery in heterogeneous environments—Part 12: Image File Format".

[11] ISO/IEC JTC 1/SC 29/WG 03 output document N0471, "Text of CDAM ISO/IEC 14496-12:2021 AMD 1 Improved brand documentation and other improvements", February 2022.

[12] Lukasz Kondrad, Lauri Ilola, Kashyap Kammachi Sreedhar, Miska M. Hannuksela, MPEG input document m59337, "On Preselection in ISOBMFF and TrackGroupDescriptionBox", April 2022.

[13] Ye-Kui Wang, MPEG input document m59365, "Indication of a sub track in a preselection", April 2022.

[14] Ye-Kui Wang, MPEG input document m59366, "Signalling of preselection information", April 2022.

FIG. 1 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4000 may include a coding component 4004 that may implement the various coding or encoding methods described in the present document. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

FIG. 2 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present document. The memory (memories) 4104 may be used for storing data and code used for implementing the methods and techniques described herein. The video processing circuitry 4106 may be used to implement, in hardware circuitry, some techniques described in the present document. In some embodiments, the video processing circuitry 4106 may be at least partly included in the processor 4102, e.g., a graphics co-processor.

FIG. 3 is a flowchart for an example method 4200 of video processing. The method 4200 includes determining a value of a track_in_movie flag for a track in a media data file at step 4202. The value of the track_in_movie flag is equal to zero when there is no preselection in the media data file that includes only the track. A conversion is performed between a visual media data and the media data file based on the track_in_movie flag at step 4204. The conversion of step 4204 may include encoding at an encoder or decoding at a decoder, depending on the example.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

FIG. 4 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVM) standard and other current and/or further standards.

Figure 5:
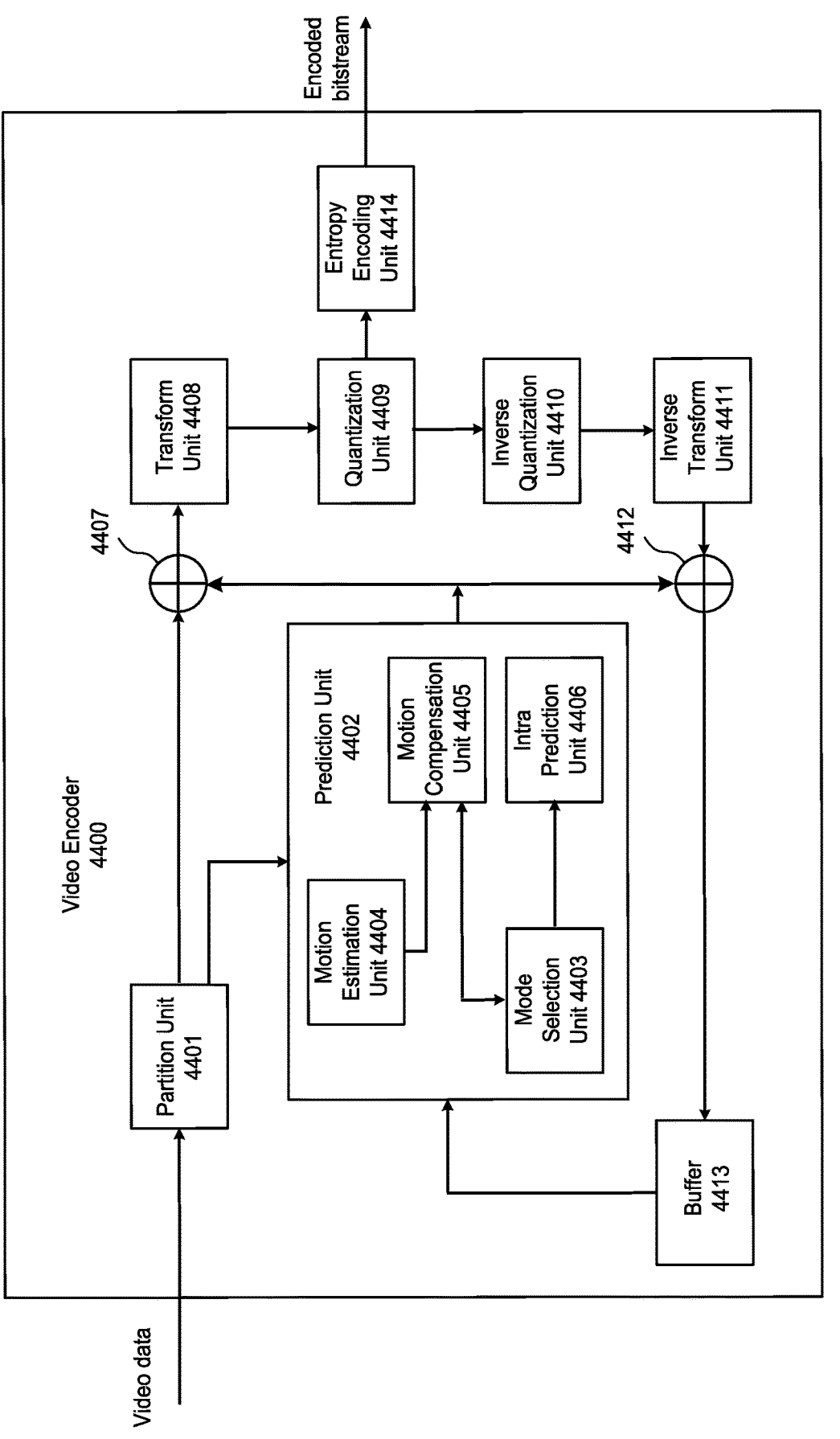
FIG. 5 is a block diagram that illustrates an example encoder.

FIG. 5 is a block diagram illustrating an example of video encoder 4400, which may be video encoder 4314 in the system 4300 illustrated in FIG. 4. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 6:
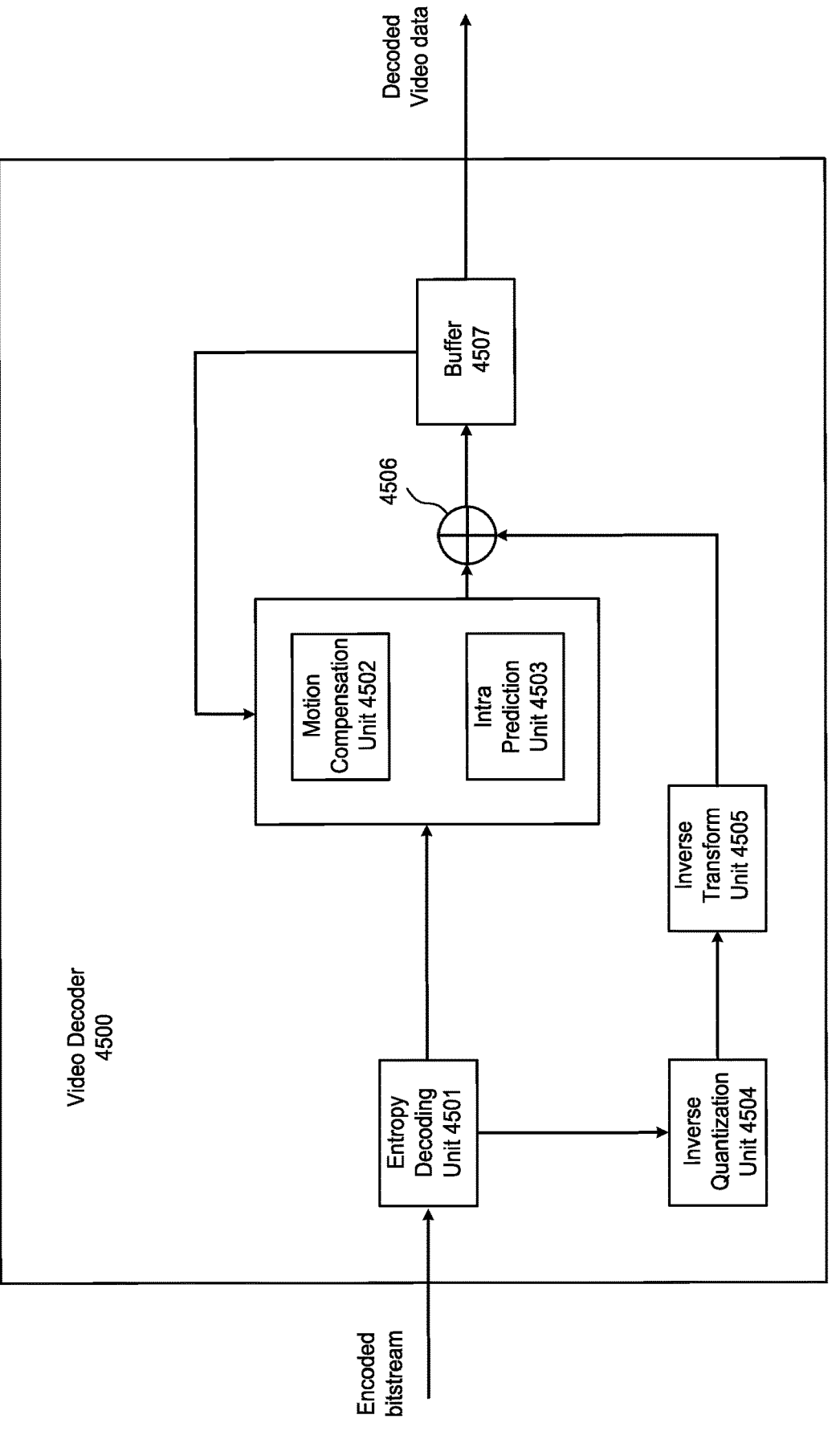
FIG. 6 is a block diagram that illustrates an example decoder.

FIG. 6 is a block diagram illustrating an example of video decoder 4500 which may be video decoder 4324 in the system 4300 illustrated in FIG. 4. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 7:
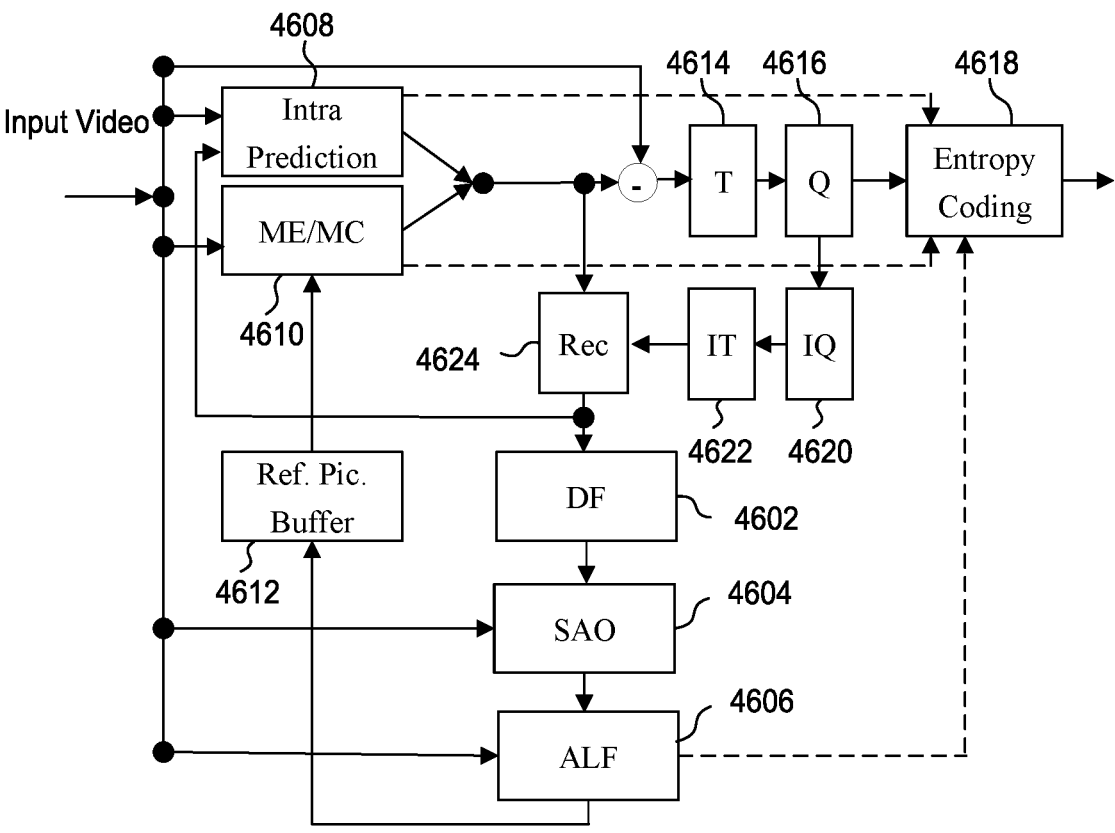
FIG. 7 is a schematic diagram of an example encoder.

FIG. 7 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

Figure 8:
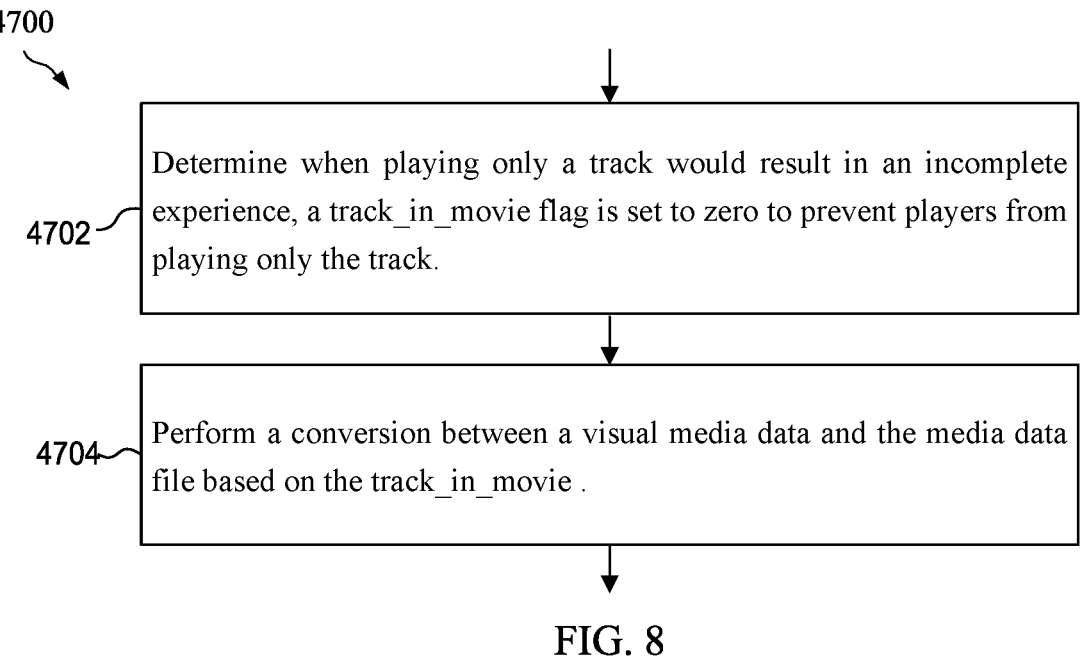
FIG. 8 is a flowchart for an example method of video processing.

FIG. 8 is a flowchart for an example method 4700 of video processing. The method 4700 includes determining when playing only a track would result in an incomplete experience, a track in movie (track_in_movie) flag is set to zero to prevent players from playing only the track at step 4702. A conversion is performed between a visual media data and a media data file based on the track_in_movie flag at step 4704. The conversion of step 4704 may include encoding at an encoder or decoding at a decoder, depending on the example.

It should be noted that the method 4700 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4700. Further, the method 4700 can be performed by a non-transitory computer readable medium comprising a computer program product for use by a video coding device. The computer program product comprises computer executable instructions stored on the non-transitory computer readable medium such that when executed by a processor cause the video coding device to perform the method 4700.

A listing of solutions preferred by some examples is provided next.

The following solutions show examples of techniques discussed herein.

The following solutions show example embodiments of techniques discussed in the previous section.

1. A method for processing video data comprising: determining a value of a track in movie flag for a track in a media data file, wherein the value of the track_in_movie flag is equal to zero when there is no preselection in the media data file that includes only the track; and performing a conversion between a visual media data and the media data file based on the track_in_movie flag.

2. The method of solution 1, wherein the track contains a preselection box.

3. The method of any of solutions 1-2, wherein the track_in_movie flag is in a track header box.

4. The method of any of solutions 1-3, wherein the track in the movie flag in the track header box is set to zero to prevent players that do not understand a Preselection Group Box from playing the track when playing the track without processing any Preselection Group Box contained in the track would result in an incomplete experience.

5. The method of solution 4, wherein there is no preselection that comprises only the track within the media data file.

6. The method of any of solutions 1-3, wherein setting the track_in_movie flag in the track header box to zero is used to prevent players not understanding the Preselection Group Box from playing the track.

7. The method of solution 6, wherein there is no preselection that comprises only the track within the media data file.

8. A method for processing video data comprising: determining a value of a track in movie flag associated with a preselection, wherein the preselection includes a set of tracks containing preselection group boxes having a first value of a track group identifier (ID), and wherein the value of the track_in_movie flag of all tracks in the preselection is zero when there is no Track Group Description Box containing a Preselection Track Group Entry Box with a track group ID equal to the first value; and performing a conversion between a visual media data and a media data file based on the track_in_movie flag.

9. The method of solution 8, wherein a preselection track group entry box is a container box for a preselection information box.

10. The method of any of solutions 8-9, wherein a preselection track group entry box is a container box for a preselection processing box.

11. The method of any of solutions 8-10, wherein the value of the track_in_movie flag in the track header boxes of all these tracks is set to zero when there is no Track Group Description Box containing a Preselection Track Group Entry Box with track_group_id equal to thisTrackGroupId within the media data file for a particular preselection that comprises a set of tracks containing Preselection Group Boxes having track_group_id equal to a particular value denoted by this-TrackGroupId.

12. The method of any of solutions 8-11, wherein setting the value of the track_in_movie flag in the Track Header Boxes of all these tracks to zero is used to prevent players from playing the set of tracks when there is no Track Group Description Box containing a Preselection Track Group Entry Box with track_group_id equal to thisTrackGroupId within the media data file for a particular preselection that comprises a set of tracks containing Preselection Group Boxes having track_group_id equal to a particular value denoted by thisTrackGroupId.

13. A method for processing video data comprising: determining a value of a track in movie (track_in_movie) flag in track header boxes (TrackHeaderBoxes) of a number of tracks is equal to zero when the number of tracks are associated with a track group identifier (track_group_id) equal to this track group identifier (thisTrackGroupId) that is less than a number of tracks (numTracks) associated with a preselection with a track_group_id equal to thisTrackGroupId; performing a conversion between a visual media data and a media data file based on the track_in_movie flag.

14. The method of solution 13, wherein the numTracks is included in a preselection information box (PreselectionInformationBox) in a preselection track group entry box (PreselectionTrackGroupEntryBox).

15. The method of any of solutions 13-14, wherein the track_group_id is contained in preselection group boxes (PreselectionGroupBoxes).

16. The method of any of solutions 13-15, wherein the value of the track_in_movie flag in the Track Header Boxes of all these tracks is set to zero when the number of tracks containing Preselection Group Boxes having track_group_id equal to a particular value denoted by thisTrackGroupId is less than numTracks in the Preselection Information Box in the Preselection Track Group Entry Box with track_group_id equal to this-TrackGroupId within the media data file.

17. The method of any of solutions 13-16, wherein setting the value of the track_in_movie flag in the Track Header Boxes of all these tracks to zero is used to prevent players from playing the set of tracks when the number of tracks containing Preselection Group Boxes having track_group_id equal to a particular value denoted by thisTrackGroupId is less than numTracks in the Preselection Information Box in the Preselection Track Group Entry Box with track_group_id equal to thisTrackGroupId within the media data file.

18. The method of any of solutions 1-17, wherein the value of the track_in_movie flag in the Track Header Boxes of all these tracks is set to zero when either or both of the following conditions are true for a particular preselection that comprises a set of N tracks containing Preselection Group Boxes having track_group_id equal to a particular value denoted by thisTrackGroupId within the media data file, and wherein the conditions are that there is no Track Group Description Box containing a Preselection Track Group Entry Box with track_group_id equal to thisTrackGroupId, and that N is less than numTracks in the Preselection Information Box in the Preselection Track Group Entry Box with track_group_id equal to thisTrackGroupId.

19. The method of any of solutions 1-17, wherein the value of the track_in_movie flag in the Track Header Boxes of all these tracks is set to zero when either or both of the following conditions is true for a particular preselection that comprises a set of N tracks containing Preselection Group Boxes having track_group_id equal to a particular value denoted by thisTrackGroupId within the media data file, and wherein the conditions are that that there is no Track Group Description Box containing a Preselection Track Group Entry Box with track_group_id equal to thisTrackGroupId, and that N is less than numTracks in the Preselection Information Box in the Preselection Track Group Entry Box with track_group_id equal to thisTrackGroupId.

20. The method of any of solutions 1-17, wherein setting the value of the track_in_movie flag in the Track Header Boxes of all these tracks to zero is used to prevent players from playing the set of tracks when either or both of the following conditions are true for a particular preselection that comprises a set of N tracks containing Preselection Group Boxes having track_group_id equal to a particular value denoted by this-TrackGroupId within the media data file, and wherein the conditions are that there is no Track Group Description Box containing a Preselection Track Group Entry Box with track_group_id equal to thisTrackGroupId, and that N is less than numTracks in the Preselection Information Box in the Preselection Track Group Entry Box with track_group_id equal to thisTrackGroupId.

21. The method of any of solutions 1-17, wherein the track_in_movie flag in the Track Header Boxes of all these tracks is set to zero to prevent players from playing the set of tracks when playing the set of tracks in a preselection in a file would result in an incomplete experience when the preselection comprises a set of N tracks containing Preselection Group Boxes having track_group_id equal to a particular value denoted by thisTrackGroupId, and either or both of the following conditions are true: that there is no Track Group Description Box containing a Preselection Track Group Entry Box with track_group_id equal to thisTrack-GroupId, and that N is less than numTracks in the Preselection Information Box in the Preselection Track Group Entry Box with track_group_id equal to this-TrackGroupId.

22. The method of any of solutions 1-17, wherein setting the value of the track_in_movie flag in the TrackHeaderBoxes of all these tracks to zero is used to prevent players from playing the set of tracks when playing the set of tracks in a preselection in a file would result in an incomplete experience when the preselection comprises a set of N tracks containing Preselection Group Boxes having track_group_id equal to a particular value denoted by thisTrackGroupId, and either or both of the following conditions are true: that there is no Track Group Description Box containing a Preselection Track Group Entry Box with track_group_id equal to thisTrackGroupId, and that N is less than numTracks in the Preselection Information Box in the Preselection Track Group Entry Box with track_group_id equal to thisTrackGroupId.

23. An apparatus for processing video data comprising: a processor; and a non-transitory memory with instructions thereon, wherein the instructions upon execution by the processor, cause the processor to perform the method of any of solutions 1-22.

24. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-22.

25. A non-transitory computer-readable recording medium storing a bitstream of a video which is generated by a method performed by a video processing apparatus, wherein the method comprises: determining a value of a track_in_movie flag for a track in a media data file, wherein the value of the track_in_movie flag is equal to zero when there is no preselection in the media data file that includes only the track; and generating a bitstream based on the determining.

26. A method for storing bitstream of a video comprising: determining a value of a track in movie flag for a track in a media data file, wherein the value of the track_in_ movie flag is equal to zero when there is no preselection in the media data file that includes only the track; generating a bitstream based on the determining; and storing the bitstream in a non-transitory computer-readable recording medium.

27. A method, apparatus or system described in the present document.

The following additional solutions show example embodiments of techniques discussed in the previous section.

1. A method for processing video data comprising: determining when playing only a track would result in an incomplete experience, a track_in_movie (track_in_ movie) flag is set to zero to prevent players from playing only the track; and performing a conversion between a visual media data and a media data file based on the track_in_movie flag.

2. The method of solution 1, wherein the media data file comprises a preselection track group entry box (PreselectionTrackGroupEntryBox), and wherein the PreselectionTrackGroupEntryBox is a container box for a preselection information box (PreselectionInformationBox).

3. The method of solution 2, wherein all attributes uniquely qualifying as a preselection shall be present in the PreselectionTrackGroupEntryBox of a preselection.

4. The method of solution 3, wherein attributes signaled in the PreselectionTrackGroupEntryBox shall take precedence over attributes signaled in contributing tracks.

5. The method of solution 4, wherein the preselection is characterized by language, kind or media specific attributes, audio rendering indications, object interactivity, or channel layouts.

6. The method of solution 5, wherein the PreselectionTrackGroupEntryBox shall describe only track groups identified by a track group type (track_group_type) equal to 'prse'.

7. The method of solution 1, wherein for a track that contains a preselection group box (PreselectionGroupBox), when within a file there is no preselection that comprises only the track, a value of the track_in_movie flag in a track header box (TrackHeaderBox) of the track shall be equal to '0'.

8. The method of solution 1, wherein when playing a track without processing any preselection group box (PreselectionGroupBox) contained in the track would result in an incomplete experience, the track_in_movie flag in a track header box (TrackHeaderBox) shall be set to '0' to prevent players not understanding the PreselectionGroupBox from playing the track.

9. The method of solution 1, wherein when playing a track without processing any preselection group box (PreselectionGroupBox) contained in the track would result in an incomplete experience, setting the track_in_ movie flag in a track header box (TrackHeaderBox) to '0' can be used to prevent players not understanding the PreselectionGroupBox from playing the track.

10. The method of solution 1, wherein within a file, for a particular preselection that comprises a set of tracks containing a preselection group box (PreselectionGroupBox) having a track group identifier (track_group_id) equal to a particular value denoted by this track group identifier (thisTrackGroupId), when there is no track group description box (TrackGroupDescriptionBox) containing a PreselectionGroupBox with track_group_id equal to thisTrackGroupId, a value of the track_in_movie flag in a track header box (TrackHeaderBox) of all these tracks is set equal to '0'.

11. The method of solution 1, wherein within a file, for a particular preselection that comprises a set of tracks containing preselection group boxes (PreselectionGroupBoxes) having a track group identifier (track_group_id) equal to a particular value denoted by this track group identifier (thisTrackGroupId), when there is no track group description box (TrackGroupDescriptionBox) containing a preselection track group entry box (PreselectionTrackGroupEntryBox) with the track_group_id equal to thisTrackGroupId, a value of the track_in_movie flag in track header boxes (TrackHeaderBoxes) of all these tracks should be set to '0'.

12. The method of solution 1, wherein within a file, for a particular preselection that comprises a set of tracks containing preselection group boxes (PreselectionGroupBoxes) having a track group identifier (track_group_id) equal to a particular value denoted by this track group identifier (thisTrackGroupId), when there is no track group description box (TrackGroupDescriptionBox) containing a preselection track group entry box (PreselectionTrackGroupEntryBox) with the track_group_id equal to thisTrackGroupId, setting a value of the track_in_movie flag in track header boxes (TrackHeaderBoxes) of all these tracks to '0' can be used to prevent players from playing the set of tracks.

13. The method of solution 1, wherein within a file, when a number of tracks containing preselection group boxes (PreselectionGroupBoxes) having a track group identifier (track_group_id) equal to a particular value denoted by this track group identifier (thisTrackGroupId) is less than a number of tracks (numTracks) in a preselection information box (PreselectionInformationBox) in a preselection track group entry box (PreselectionTrackGroupEntryBox) with the track_group_id equal to thisTrackGroupId, a value of the track_in_movie flag in track header boxes (TrackHeaderBoxes) of all these tracks shall be equal to '0'.

14. The method of solution 1, wherein within a file, when a number of tracks containing preselection group boxes (PreselectionGroupBoxes) having a track group identifier (track_group_id) equal to a particular value denoted by this track group identifier (thisTrackGroupId) is less than a number of tracks (numTracks) in preselection information box (PreselectionInformationBox) in a preselection track group entry box (PreselectionTrackGroupEntryBox) with the track_group_id equal to thisTrackGroupId, a value of the track_in_movie flag in track header boxes (TrackHeaderBoxes) of all these tracks should be set to '0'.

15. The method of solution 1, wherein within a file, when a number of tracks containing preselection group boxes (PreselectionGroupBoxes) having a track group identifier (track_group_id) equal to a particular value denoted by this track group identifier (thisTrackGroupId) is less than a number of tracks (numTracks) in a preselection information box (PreselectionInformationBox) in a preselection track group entry box (PreselectionTrackGroupEntryBox) with the track_group_id equal to thisTrackGroupId, setting a value of the track_in_movie flag in track header boxes (TrackHeaderBoxes) of all these tracks to '0' can be used to prevent players from playing a set of tracks.

16. The method of solution 1, wherein within a file, for a particular preselection that comprises a set of N tracks containing preselection group boxes (PreselectionGroupBoxes) having a track group identifier (track_group_id) equal to a particular value denoted by this track group identifier (thisTrackGroupId), when either or both of the following conditions are true, the value of the track_in_movie flag in track header boxes (TrackHeaderBoxes) of all these tracks shall be set to '0': there is no track group description box (TrackGroupDescriptionBox) containing a preselection track group entry box (PreselectionTrackGroupEntryBox) with the track_group_id equal to thisTrackGroupId; or N is less than a number of tracks (numTracks) in a preselection information box (PreselectionInformationBox) in the PreselectionTrackGroupEntryBox with the track_group_id equal to thisTrackGroupId.

17. The method of solution 1, wherein within a file, for a particular preselection that comprises a set of N tracks containing preselection group boxes (PreselectionGroupBoxes) having a track group identifier (track_group_id) equal to a particular value denoted by this track group identifier (thisTrackGroupId), when either or both of the following conditions are true, the value of the track_in_movie flag in the track header boxes (TrackHeaderBoxes) of all these tracks should be set to '0': there is no track group description box (TrackGroupDescriptionBox) containing a preselection track group entry box (PreselectionTrackGroupEntryBox) with the track_group_id equal to thisTrackGroupId; or N is less than a number of tracks (numTracks) in a preselection information box (PreselectionInformationBox) in the PreselectionTrackGroupEntryBox with the track_group_id equal to thisTrackGroupId.

18. The method of solution 1, wherein within a file, for a particular preselection that comprises a set of N tracks containing preselection group boxes (PreselectionGroupBoxes) having a track group identifier (track_group_id) equal to a particular value denoted by this track group identifier (thisTrackGroupId), when either or both of the following conditions are true, setting the value of the track_in_movie flag in the track header boxes (TrackHeaderBoxes) of all these tracks to '0' can be used to prevent players from playing the set of tracks: there is no track group description box (TrackGroupDescriptionBox) containing a preselection track group entry box (PreselectionTrackGroupEntryBox) with the track_group_id equal to thisTrackGroupId; or N is less than a number of tracks (numTracks) in a preselection information box (PreselectionInformationBox) in the PreselectionTrackGroupEntryBox with the track_group_id equal to thisTrackGroupId.

19. A non-transitory computer-readable recording medium storing a bitstream of a video which is generated by a method performed by a video processing apparatus, wherein the method comprises: determining when playing only a track would result in an incomplete experience, a track in movie (track_in_movie) flag is set to zero to prevent players from playing only the track; and generating a bitstream based on the determining.

20. A method for storing bitstream of a video comprising: determining when playing only a track would result in an incomplete experience, a track_in_movie (track_in_movie) flag is set to zero to prevent players from playing only the track; generating a bitstream based on the determining; and storing the bitstream in a non-transitory computer-readable recording medium.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data comprising:

determining when playing only a track would result in an incomplete experience, a track in movie (track_in_movie) flag is set to zero to prevent players from playing only the track; and performing a conversion between a visual media data and a media data file based on the track_in_movie flag.

2. The method of claim 1, wherein the media data file comprises a preselection track group entry box (PreselectionTrackGroupEntryBox), and wherein the PreselectionTrackGroupEntryBox is a container box for a preselection information box (PreselectionInformationBox).

3. The method of claim 2, wherein all attributes uniquely qualifying as a preselection shall be present in the PreselectionTrackGroupEntryBox of a preselection.

4. The method of claim 3, wherein attributes signaled in the PreselectionTrackGroupEntryBox shall take precedence over attributes signaled in contributing tracks.

5. The method of claim 4, wherein the preselection is characterized by language, kind or media specific attributes, audio rendering indications, object interactivity, or channel layouts.

6. The method of claim 5, wherein the PreselectionTrackGroupEntryBox shall describe only track groups identified by a track group type (track_group_type) equal to 'prse'.

7. The method of claim 1, wherein for a track that contains a preselection group box (PreselectionGroupBox), when within a file there is no preselection that comprises only the track, a value of the track_in_movie flag in a track header box (TrackHeaderBox) of the track shall be equal to '0'.

8. The method of claim 1, wherein when playing a track without processing any preselection group box (PreselectionGroupBox) contained in the track would result in an incomplete experience, the track_in_movie flag in a track header box (TrackHeaderBox) shall be set to '0' to prevent players not understanding the PreselectionGroupBox from playing the track.

9. The method of claim 1, wherein when playing a track without processing any preselection group box (PreselectionGroupBox) contained in the track would result in an incomplete experience, setting the track_in_movie flag in a track header box (TrackHeaderBox) to '0' can be used to prevent players not understanding the PreselectionGroupBox from playing the track.

10. The method of claim 1, wherein within a file, for a particular preselection that comprises a set of tracks containing a preselection group box (PreselectionGroupBox) having a track group identifier (track_group_id) equal to a particular value denoted by this track group identifier (thisTrackGroupId), when there is no track group description box (TrackGroupDescriptionBox) containing a PreselectionGroupBox with track_group_id equal to thisTrackGroupId, a value of the track_in_movie flag in a track header box (TrackHeaderBox) of all these tracks is set equal to '0'.

11. The method of claim 1, wherein within a file, for a particular preselection that comprises a set of tracks containing preselection group boxes (PreselectionGroupBoxes) having a track group identifier (track_group_id) equal to a particular value denoted by this track group identifier (thisTrackGroupId), when there is no track group description box (TrackGroupDescriptionBox) containing a preselection track group entry box (PreselectionTrackGroupEntryBox) with the track_group_id equal to thisTrackGroupId, a value of the track_in_movie flag in track header boxes (TrackHeaderBoxes) of all these tracks should be set to '0'.

12. The method of claim 1, wherein within a file, for a particular preselection that comprises a set of tracks containing preselection group boxes (PreselectionGroupBoxes) having a track group identifier (track_group_id) equal to a particular value denoted by this track group identifier (thisTrackGroupId), when there is no track group description box (TrackGroupDescriptionBox) containing a preselection track group entry box (PreselectionTrackGroupEntryBox) with the track_group_id equal to thisTrackGroupId, setting a value of the track_in_movie flag in track header boxes (TrackHeaderBoxes) of all these tracks to '0' can be used to prevent players from playing the set of tracks.

13. The method of claim 1, wherein within a file, when a number of tracks containing preselection group boxes (PreselectionGroupBoxes) having a track group identifier (track_group_id) equal to a particular value denoted by this track group identifier (thisTrackGroupId) is less than a number of tracks (numTracks) in a preselection information box (PreselectionInformationBox) in a preselection track group entry box (PreselectionTrackGroupEntryBox) with the track_group_id equal to thisTrackGroupId, a value of the track_in_movie flag in track header boxes (TrackHeaderBoxes) of all these tracks shall be equal to '0'.

14. The method of claim 1, wherein within a file, when a number of tracks containing preselection group boxes (PreselectionGroupBoxes) having a track group identifier (track_group_id) equal to a particular value denoted by this track group identifier (thisTrackGroupId) is less than a number of tracks (numTracks) in preselection information box (PreselectionInformationBox) in box a preselection track group entry (PreselectionTrackGroupEntryBox) with the track_group_id equal to thisTrackGroupId, a value of the track_in_movie flag in track header boxes (TrackHeaderBoxes) of all these tracks should be set to '0'.

15. The method of claim 1, wherein within a file, when a number of tracks containing preselection group boxes (PreselectionGroupBoxes) having a track group identifier (track_group_id) equal to a particular value denoted by this track group identifier (thisTrackGroupId) is less than a number of tracks (numTracks) in a preselection information box (PreselectionInformationBox) in a preselection track group entry box (PreselectionTrackGroupEntryBox) with the track_group_id equal to thisTrackGroupId, setting a value of the track_in_movie flag in track header boxes (TrackHeaderBoxes) of all these tracks to '0' can be used to prevent players from playing a set of tracks.

16. The method of claim 1, wherein within a file, for a particular preselection that comprises a set of N tracks containing preselection group boxes (PreselectionGroupBoxes) having a track group identifier (track_group_id) equal to a particular value denoted by this track group identifier (thisTrackGroupId), when either or both of the following conditions are true, the value of the track_in_movie flag in track header boxes (TrackHeaderBoxes) of all these tracks shall be set to '0':

there is no track group description box (TrackGroupDescriptionBox) containing a preselection track group entry box (PreselectionTrackGroupEntryBox) with the track_group_id equal to thisTrackGroupId; or N is less than a number of tracks (numTracks) in a preselection information box (PreselectionInformationBox) in the PreselectionTrackGroupEntryBox with the track_group_id equal to this TrackGroupId.

17. The method of claim 1, wherein within a file, for a particular preselection that comprises a set of N tracks containing preselection group boxes (PreselectionGroupBoxes) having a track group identifier (track_group_id)

equal to a particular value denoted by this track group identifier (thisTrackGroupId), when either or both of the following conditions are true, the value of the track_in_movie flag in the track header boxes (TrackHeaderBoxes) of all these tracks should be set to '0':

there is no track group description box (TrackGroupDescriptionBox) containing a preselection track group entry box (PreselectionTrackGroupEntryBox) with the track_group_id equal to thisTrackGroupId; or N is less than a number of tracks (numTracks) in a preselection information box (PreselectionInformationBox) in the PreselectionTrackGroupEntryBox with the track_group_id equal to this TrackGroupId.

18. The method of claim 1, wherein within a file, for a particular preselection that comprises a set of N tracks containing preselection group boxes (PreselectionGroupBoxes) having a track group identifier (track_group_id) equal to a particular value denoted by this track group identifier (thisTrackGroupId), when either or both of the following conditions are true, setting the value of the track_in_movie flag in the track header boxes (TrackHeaderBoxes) of all these tracks to '0' can be used to prevent players from playing the set of tracks:

there is no track group description box (TrackGroupDescriptionBox) containing a preselection track group entry box (PreselectionTrackGroupEntryBox) with the track_group_id equal to this TrackGroupId; or N is less than a number of tracks (numTracks) in a preselection information box (PreselectionInformationBox) in the PreselectionTrackGroupEntryBox with the track_group_id equal to thisTrackGroupId.

19. A non-transitory computer-readable recording medium storing a bitstream of a video which is generated by a method performed by a video processing apparatus, wherein the method comprises:

determining when playing only a track would result in an incomplete experience, a track in movie (track_in_movie) flag is set to zero to prevent players from playing only the track; and generating a bitstream based on the determining.

20. A method for storing bitstream of a video comprising:

determining when playing only a track would result in an incomplete experience, a track in movie (track_in_movie) flag is set to zero to prevent players from playing only the track;

generating a bitstream based on the determining; and storing the bitstream in a non-transitory computer-readable recording medium.

* * * * *